United States Patent
Citerin et al.

(10) Patent No.: US 10,078,785 B2
(45) Date of Patent: Sep. 18, 2018

(54) VIDEO-BASED SOUND SOURCE SEPARATION

(71) Applicant: CANON KABUSHIKI KAISHA, Tokyo (JP)

(72) Inventors: Johann Citerin, Cesson-Sevigne (FR); Gérald Kergourlay, Chevaigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 14/970,411

(22) Filed: Dec. 15, 2015

(65) Prior Publication Data

US 2016/0180865 A1    Jun. 23, 2016

(30) Foreign Application Priority Data

Dec. 18, 2014  (GB) .................................. 1422597.3

(51) Int. Cl.
  *G06K 9/00* (2006.01)
  *G10L 21/028* (2013.01)

(52) U.S. Cl.
  CPC ....... *G06K 9/00771* (2013.01); *G06K 9/0057* (2013.01); *G10L 21/028* (2013.01)

(58) Field of Classification Search
  None
  See application file for complete search history.

(56) References Cited

U.S. PATENT DOCUMENTS

| 7,269,560 | B2* | 9/2007 | Hershey | G10L 15/065 704/240 |
| 7,536,029 | B2* | 5/2009 | Choi | G01S 3/7864 348/14.04 |
| 9,495,591 | B2* | 11/2016 | Visser | G06K 9/00624 |
| 2002/0075295 | A1* | 6/2002 | Stentz | G09G 5/00 715/727 |
| 2004/0001137 | A1* | 1/2004 | Cutler | H04N 5/2259 348/14.08 |
| 2004/0001143 | A1* | 1/2004 | Beal | G06K 9/0057 348/169 |
| 2005/0228673 | A1* | 10/2005 | Nefian | G10L 15/25 704/270 |
| 2011/0305439 | A1* | 12/2011 | Chaudhuri | G09B 5/06 386/285 |
| 2013/0151249 | A1 | 6/2013 | Nakadai | |
| 2013/0297296 | A1 | 11/2013 | Yoo | |
| 2014/0211969 | A1* | 7/2014 | Kim | H03G 3/04 381/109 |

(Continued)

FOREIGN PATENT DOCUMENTS

WO    2006121896 A2    11/2006

*Primary Examiner* — Shervin Nakhjavan
(74) *Attorney, Agent, or Firm* — Canon U.S.A., Inc. IP Division

(57) ABSTRACT

A sound source separation method comprising the steps of determining at least one location of at least one sound source based on video data, determining initial estimates of at least two parameters characterizing an audio signal emitted by said sound source, said initial estimates being determined based on said at least one location, performing an expectation-maximization method for determining final estimates of said parameters, and separating the audio signal from a combination of audio signals based on said final estimates of said parameters.

19 Claims, 10 Drawing Sheets

(56) References Cited

U.S. PATENT DOCUMENTS

| | | | | |
|---|---|---|---|---|
| 2014/0314391 A1* | 10/2014 | Kim | ............ | G11B 27/11 |
| | | | | 386/248 |
| 2015/0350716 A1* | 12/2015 | Kruglick | ............ | H04N 21/4394 |
| | | | | 386/241 |
| 2015/0365759 A1* | 12/2015 | Dimitriadis | ............ | G06K 9/00684 |
| | | | | 381/71.1 |
| 2015/0380054 A1* | 12/2015 | Vilermo | ............ | G11B 27/10 |
| | | | | 386/201 |
| 2016/0080684 A1* | 3/2016 | Farrell | ............ | H04N 5/77 |
| | | | | 386/227 |

* cited by examiner

Fig. 1a
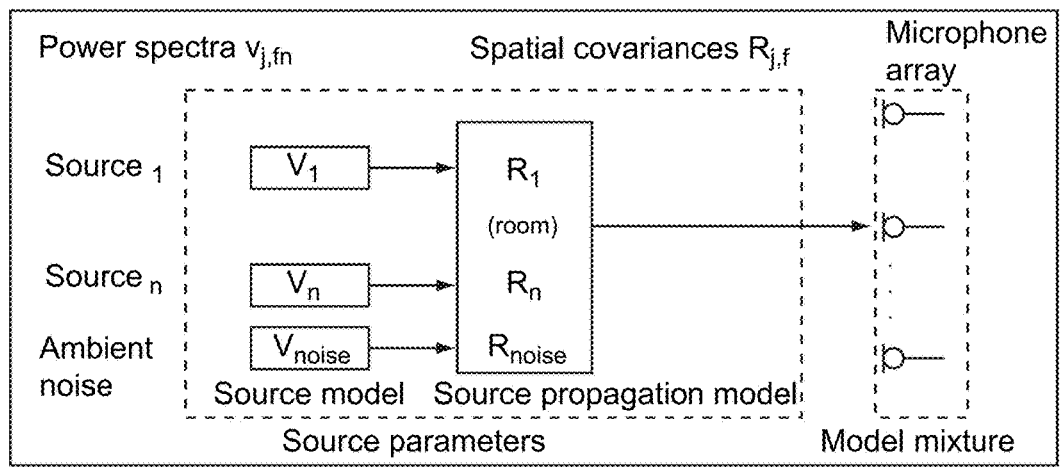
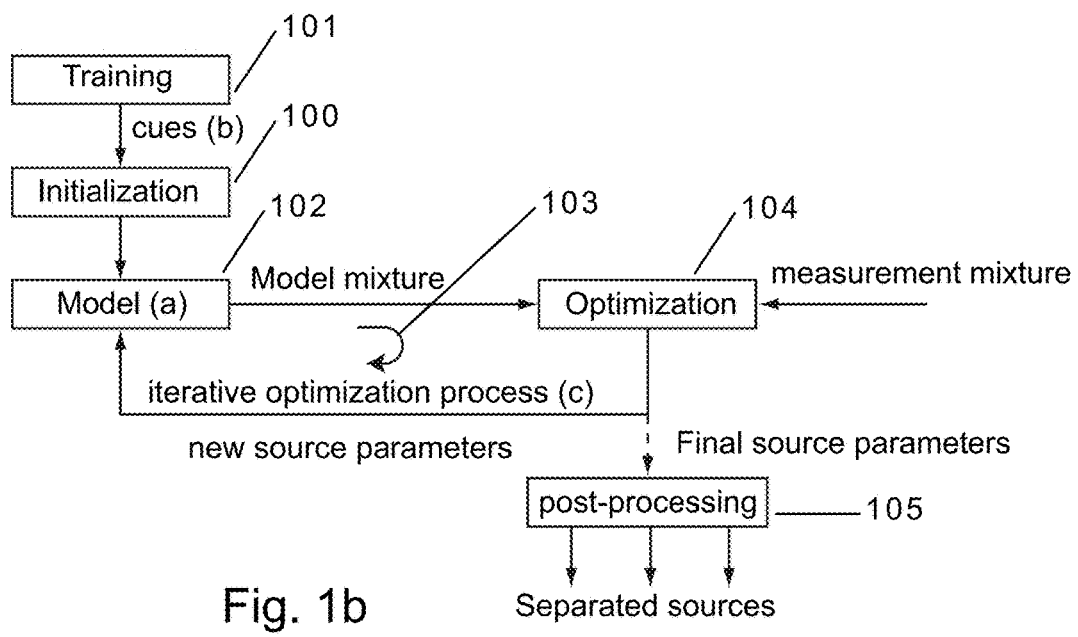
Fig. 1b

VIDEO-BASED SOUND SOURCE SEPARATION

VIDEO-BASED SOUND SOURCE SEPARATION

This application claims the benefit under 35 U.S.C. § 119(a)-(d) of United Kingdom Patent Application No. 1422597.3, filed on Dec. 18, 2014 and entitled "Video-based Sound Source Separation". The above cited patent application is incorporated herein by reference in its entirety.

FIELD OF THE INVENTION

The present invention relates to sound source separation techniques. Such techniques make it possible to separate, from mixed audio signals (or sound signals) emitted by a plurality of audio sources (or sound sources), an audio signal originating from an audio source of the plurality.

The invention may have applications notably in Audio-Video surveillance.

BACKGROUND OF THE INVENTION

Video surveillance is currently widespread in areas like crime prevention, private and public areas security purposes, abnormal events detection, traffic monitoring, customer behaviour or general data gathering, etc.

Most camera uses are primarily based on video only. However, there is an interest in recording other complementary data as well, in particular audio data.

Most of the current cameras are equipped with microphones. However, the use of audio stream is very limited today. This is essentially due to the particular constraints of video surveillance environments. First, video surveillance is typically used in complex audio environments, including noisy environments with many simultaneous sound sources. Secondly, it is not possible to focus on specific sources of interest.

For example, conversations of interest between people may be drowned out by ambient noise, so that the audio stream is generally not usable.

Therefore, solutions that make it possible to focus on specific sources and separate them from ambient noise are desirable. Sound sources separation techniques are therefore of interest in the context of video-surveillance.

Several sound source separation methods have been developed in the last decades. However, none concerns the video-surveillance context.

"Classical" signal processing methods such as Binary Masking (BM) and Independent Component Analysis (ICA) have been used first. However, their efficiency is very limited, and none is usable in the typical noisy environments of video surveillance.

Statistical signal processing methods have been developed more recently. The most advanced ones are known as "variance-based" methods. They are much more efficient and are more robust to noise, as compared to the classical methods. However, they need a particular initialization known as "training" of the sources. It consists in learning the audio signature of each source of interest to be separated. The training necessitates an individual recording of each target source alone, which is not possible in the video surveillance context.

FIGS. 1a-1b illustrate a "variance-based method". Such method is based on Bayesian methods. The general principle of the method is to use statistics to infer causes from all available information, i.e to retrieve sources from a sound "mixture" (comprising the plurality of sound signals to be separated and the ambient noise) and additional information in the case of sound separation. Variance-based methods are based on the variance of the signals rather than the signals themselves. Variance is easier to manipulate and separate than the source signals themselves.

FIG. 1a illustrates a sound source separation context. A plurality of sources "source 1", . . . , "source n" emit respective sound signals represented, for each time-frequency bin (f,n), by their respective power spectra $v_1, \ldots, v_n$. The sound signal of the ambient noise is represented by a power spectrum $v_{noise}$. The set of power spectra $v_1, \ldots, v_n$ and $v_{noise}$ is the "source model". The propagation of the sound signals, for example in a room is represented by a covariance matrix, having spatial covariances $R_1, \ldots, R_n$, $R_{noise}$ for each power spectra $v_1, \ldots, v_n$ and $v_{noise}$. The set of spatial covariances $R_1, \ldots, R_n, R_{noise}$ is the "source propagation model". The source model and the source propagation model represent the sources parameters. The sound signals emitted by the sources and the ambient noise are mixed and the mixture $R_{noise}v_{noise}+\Sigma_{j=1}^{J}R_jv_j$ is captured by a microphone array. Sound separation systems usually comprise a plurality of microphones configured for capturing the audio mixture. The microphones of the plurality are disposed according to a spatial configuration referred to as an "array". The microphone array records the mixture of audio signals from the audio sources. Each audio signal is predominant relatively to the others at some time-frequency bins when the corresponding source "speaks". Also, the microphones are situated at different positions. In addition, the audio signals received by the microphones are characterized by respective spectral contents of the audio signal emitted.

The mixture is represented by a sum of elementary signals. The sound source separation aims at recovering the elementary signals.

In the present case of sound source separation, the "causes" are the signal of each sound source, and the available information is:
  the sound mixture (which can be measured by the microphone array) and
  other additional cues about sound sources characteristics (e.g. the location of the sources, the spectrum—which can be learned through training, etc.).

This available information can be used to retrieve source signals only if there are means for associating the causes with consequences. A model is needed between source signals and the corresponding mixture, i.e. the sound propagation model.

Therefore, in addition to the mixture, the variance-based methods require (as explained hereinafter with reference to FIG. 1b):
  A sound propagation model (a),
  Some additional cues, which are used to initialize the model (b), and
  Some additional optimization steps to refine the corresponding results (c), because initialization is usually not perfect.

In the case of variance-based methods, the sound source propagation model is usually a robust variance representation.

FIG. 1b is a general flowchart of steps for separating said signals in the context of FIG. 1a.

In an initialization step 100 the model (comprising the source model and the source propagation model) is initialized. The initialization step may be seen as a "first guess".

The aim is to start from source signals which are not too far from the real source signals that are to be separated from the mixture. This first guess is obtained from the cues. In order to obtain the cues, a training step 101 is performed. Training methods usually consists in recording each source individually, thereby extracting the "signature" (the spectrum) of each source.

The signals are first separated based on the model as initialized during a step 102. Next, an iterative optimization process 103 takes place.

The optimization is needed because the "first guess" initialization does not lead to the source signals to be obtained (separated). Also, the initialization leads to an estimated mixture (comprising the first separated signals) which is different from the real recorded mixture. Optimization techniques are used for modifying this first guess so as to obtain an estimated mixture which is closer to the real mixture. By doing so, separated signals are obtained which are closer to the real signals measured.

The mixture is measured by the microphone array and optimized source parameters are computed during a step 104. The optimized source parameters are then fed to the model and so on during the iterative process.

When the model has "converged" to an acceptable model, the final source parameters are post-processed during a step 105 in order to obtain the final separated sound source signals.

A popular optimization method for (c) is the "expectation-maximization" (or "EM" method). It consists in using an iterative mathematical optimization method which modifies the signals so as to get more probable signals at each step, until it converges. This optimization method leads to a realistic separation only if the initialization is not too far from the real signal. Otherwise, it converges to an irrelevant mixture. It means that the efficiency of the initialization step is crucial for the quality of the separation, and it needs robust cues (this method is well known to the skilled person).

The cues are obtained through training, which leads to the extraction of some source information. This helps initializing some parts of the signal, but, due to the nature of the signal itself, only a part of the signal can be initialized through training.

Mixture and sources are represented as a set of elementary time-frequency elements, also known as time-frequency bins (f,n), wherein f represents the frequency and n time. When it is dealt with time-frequency bins, the notation n) is used. Notation fn may also be used as an abbreviation. Each individual source j to be separated is represented by a signal $y_{j,fn}$ for the frequency f and the time n. The mixture $x_{fn}$ represented is represented for frequency f and time n by the sum of all sources (the noise is considered as a source):

$$x_{fn} = \sum_{j=1}^{J} y_{j,fn}.$$

Each signal variance $y_{j,fn} y_{j,fn}^H$ can be split into 2 parts (or matrices in the mathematical representation), one time-independent part $R_{j,f}$ and one time-dependent part $v_{j,fn}$:

$y_{j,fn} y_{j,fn}^H = R_{j,f} v_{j,fn}$, where $R_{j,f}$ is the spatial covariance matrix and $v_{j,fn}$ is the power spectrum.

The time-dependent part $v_{j,fn}$ can be further split into a physically meaningful representation, i.e. into three different parts:

$$y_{j,fn} y_{j,fn}^H =$$
$$R_{j,f} v_{j,fn} = R_{j,f} \odot \text{Global spectrum} \odot \text{Instantaneous spectum} \odot \text{Activity} =$$
$$R_{j,f} F_{j,f} W_{j,fn} T_{j,n},$$

where $\odot$ corresponds to the entry-wise matrix multiplication.

Thus, the signal variance can be defined through four elements:
- the $R_{j,f}$ part which corresponds to the sound propagation effect, which depends only on source position relatively to the microphone position. This does not depend on time.
- the "Global spectrum" part $F_{j,f}$ which corresponds to the intrinsic spectrum of the source, which is the source signature. It depends only on the source identity, not on the content of the signal itself. This does not depend on time.
- the "Instantaneous spectrum" part $W_{j,fn}$ which corresponds to the instantaneous spectrum related to the content of the signal itself. It changes continuously as a source is active. It depends on time.
- the "Activity" part $T_{j,n}$ which corresponds to the instantaneous energy of the signal emitted by a source. It depends on time.

A classical training consists in recording each source individually. However, the content of a signal of a source during training is different from the content of the signal of the same source in the mixture to be processed for separation. It means that for each source j, the variance $R_{j,f} v_{j,fn_{training}}$ during training is different from the variance $R_{j,f} v_{j,fn_{mixture}}$ in the mixture. Since $R_{j,f}$ is constant, this also means that the power spectra $v_{j,fn_{training}}$ during training is different from the power spectra $v_{j,fn_{mixture}}$ in the mixture. Said differently, the power spectra $v_{j,fn}$ is not the same during training and in the mixture. Only the constant part $R_{j,f}$ (not depending on time) can be determined through training, i.e. the spatial and global spectrum parts. The power spectra $v_{j,fn}$ is initialized randomly.

Variance-based methods require training. However, the training-based initialization approach suffers from several drawbacks.

The initialization is incomplete since only 2 of the 4 parts of the signal are initialized based on real cues (the two parts $R_{j,f}$ and $F_{j,f}$ which are independent from time). The other two parts are randomly initialized.

Also, it is not practical since there is a need for recording the sources individually, without any other source or noise. In many cases, including video-surveillance, this may not be possible at all.

Thus, there is a need for enhanced sound source separation techniques, in particular in the context of video surveillance.

The present invention lies within this context.

SUMMARY OF THE INVENTION

According to a first aspect of the invention there is provided a sound source separation method comprising the following steps:

determining at least one location of at least one sound source based on video data, determining initial estimates of at least two parameters characterizing an audio signal emitted by said sound source, said initial estimates being determined based on said at least one location, performing an expectation-maximization method for determining final estimates of said parameters, and separating the audio signal from a combination of audio signals based on said final estimates of said parameters.

Embodiments make it possible to use variance-based processes efficiently without any training. Variance-based processes can thus be used in the difficult context of video surveillance.

Embodiments provide a new initialization method thereby avoiding training. Sound source information (i.e. location, spectrum and time activity information of the sources which are classically obtained only through training) can be obtained without a training process.

Methods according to embodiments are more suitable to the difficult video-surveillance context, contrary to other variance-based methods because training is not mandatory.

Also, high performances can be reached, which are at least comparable to variance-based methods with training and which are superior to the performances of methods without training.

Initialization based on image data makes it possible to focus the separation on specific targets defined by a user (contrary to other variance-based methods).

For example, said determination of initial estimates of said at least two parameters comprises determining time-independent spatial parameters.

For example, said determination of initial estimates of said at least two parameters is part of an initialization of a sound propagation model.

For example, said determination of initial estimates of said at least two parameters comprises determining power spectra parameters.

For example, said video data comprises video surveillance data.

The method may further comprise:
detecting a noise signal based on said video data,
determining initial estimates of at least two parameters characterizing said noise signal,
and
said expectation-maximization method may be also performed for determining final estimates of said at least two parameters characterizing said noise signal, and
separating the audio signal from a combination of audio signals may be also based on said final estimates of said at least two parameters characterizing said noise signal.

For example, said determination of at least one location of at least one sound source based on video data comprises a binary masking step.

The method may further comprise the following steps:
obtaining a plurality of separated signals separated from said combination of audio signals,
determining a first frequency spectrum and a first activity parameter for a first separated signal of said plurality,
determining a second frequency spectrum and a second activity parameter for a second separated signal of said plurality,
removing interferences from said second separated signal based on said first and second frequency spectra and activity parameters, thereby obtaining an enhanced separated signal.

For example, said second separated signal is obtained from a processing of stereo signals from a microphone array.

For example, said second separated signal is obtained from an averaging of stereo signals.

The method may further comprise a step of normalizing said separated signals of said plurality.

For example, determining the first and second frequency spectra and activity parameters comprises applying a filter corresponding to the sound perception of a human ear.

For example, said removing of the interferences comprises an anomaly detection step.

For example, said anomaly detection step is based on a machine learning process.

According to a second aspect of the invention there is provided a sound source separation enhancement method comprising the following steps:
obtaining a plurality of separated signals separated from a combination of audio signals,
determining a first frequency spectrum and a first activity parameter for a first separated signal of said plurality,
determining a second frequency spectrum and a second activity parameter for a second separated signal of said plurality,
removing interferences from said second separated signal based on said first and second frequency spectra and activity parameters, thereby obtaining an enhanced separated signal.

For example, said second separated signal is phase independent.

For example, said second separated signal is obtained from a processing of stereo signals from a microphone array.

For example, said second separated signal is obtained from an averaging of stereo signals.

The method may further comprise a step of normalizing said separated signals of said plurality.

For example, determining the first and second frequency spectra and activity parameters comprises applying a filter corresponding to the sound perception of a human ear.

For example, said removing of the interferences comprises an anomaly detection step.

For example, said anomaly detection step is based on a machine learning process.

According to a third aspect of the invention there is provided a device for implementing a method according to the first and/or second aspects.

According to a fourth aspect of the invention there are provided computer programs and computer program products comprising instructions for implementing methods according to the first, and/or second aspect(s) of the invention, when loaded and executed on computer means of a programmable apparatus.

The objects according to the second, third and fourth aspects of the invention provide at least the same advantages as those provided by the method according to the first aspect.

BRIEF DESCRIPTION OF THE DRAWINGS

Features and advantages of the invention will become apparent from the following description of non-limiting exemplary embodiments, with reference to the appended drawings, in which in addition to FIGS. 1a-1b.

DETAILED DESCRIPTION OF THE INVENTION

Figure 2A:
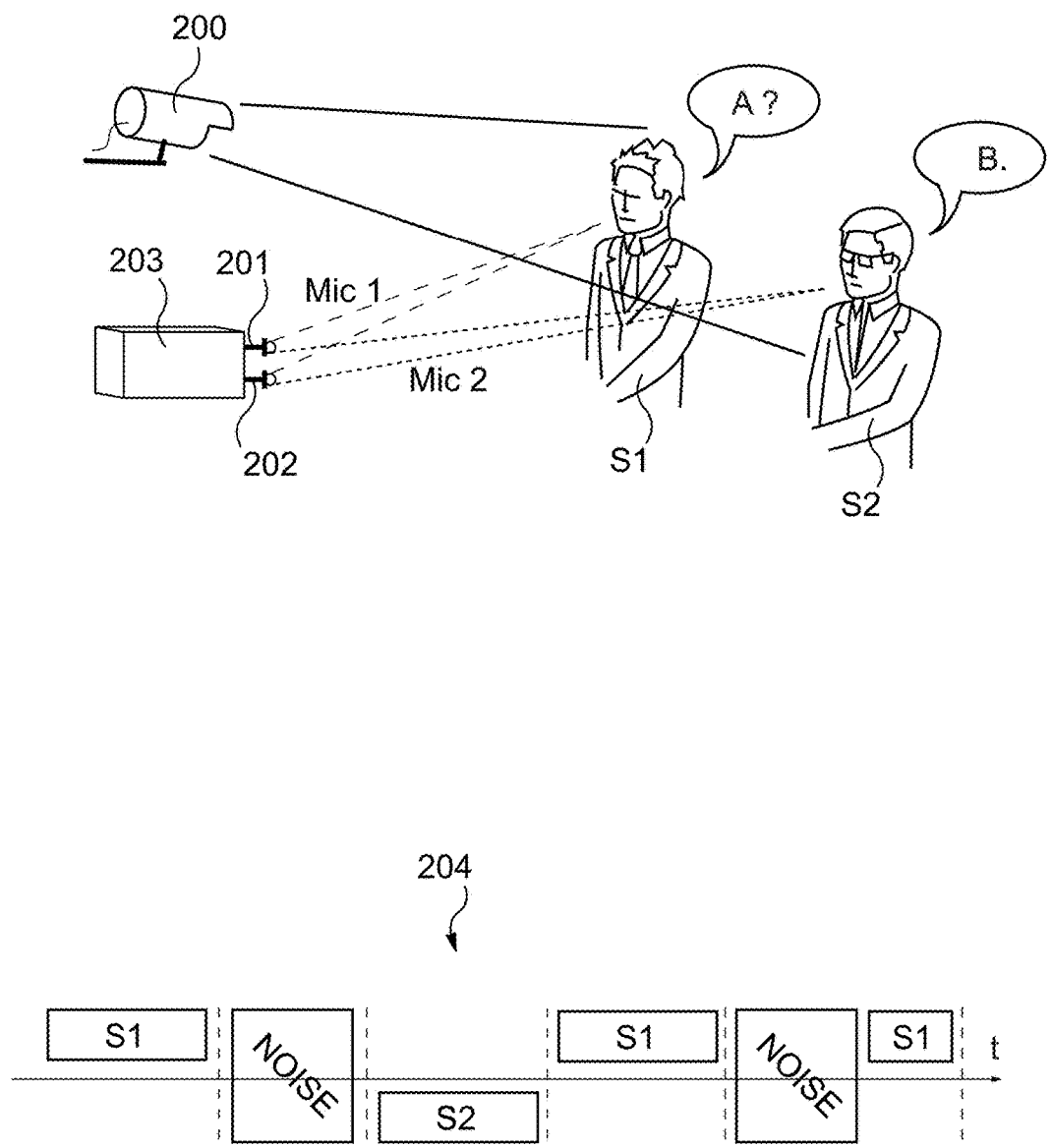
FIG. 2a illustrates a general context of implementation of embodiments.

According to a general principle of the invention, audio signals are separated in an efficient fashion, without necessitating a training process.

In order to perform an initialization of a variance-based model, an alternative to the training process has been found in the image data associated to the audio data in video data. Image data is used as an alternative cue for attributing the appropriate parts of a mixture signal to the appropriate sources.

In what follows embodiments are described comprising two stages. In a first stage ("Stage 1") image information of video data is used for initializing a variance-based process. In a second stage ("Stage 2") interferences left by Stage 1 between the sources are removed.

In Stage 1, cues for each sound source are searched for in image data of a video. There are two types of sources. Noise comes from many directions and is therefore not localized. Sources of interest (such as a human speaker) are localized at particular positions.

Video data makes it possible to obtain cues about both types of sources. With the video data, it is possible to determine when the sources (not noise) are active and when they are not. When no source is active, it is possible to perform a training on noise (it is thus possible to obtain the time-independent spatial parameter $R_{j,f\ noise}$ for the noise). As already discussed hereinabove, the mixture $x_{fn}$ is represented at time-frequency bin $f_n$ by the sum of all source signals $y_{j,fn}$ including noise which is considered as a source):

$$x_{fn} = \Sigma_{j=1}^J y_{j,fn}.$$

Each signal variance $y_{j,fn} y_{j,fn}^H$ is split into two parts, one constant part $R_{j,f}$ and one time-dependent part $v_{j,fn}$:

$$y_{j,fn} y_{j,fn}^H = R_{j,f} v_{j,fn},$$

where $R_{j,f}$ is the spatial covariance matrix and $v_{j,fn}$ is the power spectrum.

The time-dependent part $v_{j,fn}$ is further split into three different parts:

$$y_{j,fn} y_{j,fn}^H =$$

$$R_{j,f} v_{j,fn} = R_{j,f} \odot \text{Global spectrum} \odot \text{Instantaneous spectum} \odot \text{Activity} =$$

$$R_{j,f} F_{j,f} W_{j,fn} T_{j,n},$$

where $\odot$ corresponds to the entrywise matrix multiplication.

Thus, the signal variance can be defined through four elements:
- the $R_{j,f}$ part which corresponds to the sound propagation effect, which depends only on source position relatively to the microphone position. This does not depend on time.
- the "Global spectrum" part $F_{j,f}$ which corresponds to the intrinsic spectrum of the source, which is the source signature. It depends only on the source identity, not on the content of the signal itself. This does not depend on time.
- the "Instantaneous spectrum" part $W_{j,fn}$ which corresponds to the instantaneous spectrum related to the content of the signal itself. It changes continuously as a source is active. It depends on time.
- the "Activity" part $T_{j,n}$ which corresponds to the instantaneous energy of the signal emitted by a source. It depends on time.

Video data make it possible to obtain accurate positions of the sources. Thus, a location-based separation process (e.g. Binary Masking) may be performed from which the time-independent spatial parameters $R_{j,f\ sources}$ for the sources may be further extracted.

The $R_{j,f}$ parameters determined based on the video data are used in Stage 1 for initializing a variance-based separation process.

Stage 1 makes it possible to separate the source signals.

However, in order to enhance the separation, Stage 2 may be further implemented after Stage 1. In particular, Stage 2 may be used for suppressing interferences that may exist between the separated signals. Stage 1 and Stage 2 may be used in combination but not necessarily.

In Stage 2, the separated signals are used for obtaining information relating to the power spectra $v_{j,fn}$ parameters. For example, spectrum and activity extractors may be used.

The spectrum and activity data is fed as a training dataset to a Machine Learning Clustering process. Each separated signal j from Stage 1 is used as a training dataset to detect the interferences of signal j in the other separated signals k (k≠j).

Once the clustering process performed, the interferences are removed and the final separated signals are obtained.

The above stages may be used in combination with each other. However, they may also be used independently, in combination, or not, with other techniques.

FIG. 2a illustrates a general context of implementation of embodiments of the invention.

Two persons, denoted S1 and S2 (the "sources") are talking one with the other. The conversation is captured by a camera 200, thereby obtaining image data, and a set of microphones 201 (mic1), 202 (mic2) of a sound system 203, thereby obtaining audio data. The sound system may be embedded in the camera or may be a separate system associated with the camera.

Having the sound system located at a same place as the camera (for example in an embedded arrangement) is simpler. This avoids implementing a calibration step that has to be carried out when the sound system is not situated at a same place as the camera. In such a case, the movements of the camera relatively to the sound system have to be known and monitored. Also, the localization of the objects in the images acquired by the camera must be known in a coordinates system associated with the sound system (more specifically associated with the set of microphones).

Based on the analysis of the image data, the periods 204 comprising periods of activity of each source and noise-only periods are determined.

Thus, each audio signal obtained in each period of activity is associated with one source or the other ("S1" and "S2" boxes). When no source is "active" (i.e. no one is talking) the audio signal obtained during this period is associated with a silence period or noise period ("NOISE" boxes).

The context of FIG. 2a is purely illustrative. One or several cameras may be used. One or several microphones may be used. The conversation between two or more persons may be monitored. A person speaking alone or over the telephone may also be monitored.

In order to determine the localisation of the sources in the images, target detection algorithms may be used. For example such algorithms may be entirely automatic. They may also require actions from a user such as clicking on a target on images (for example clicking on a face of a person). On may also envisage using a lips detection algorithm.

Figure 2B:
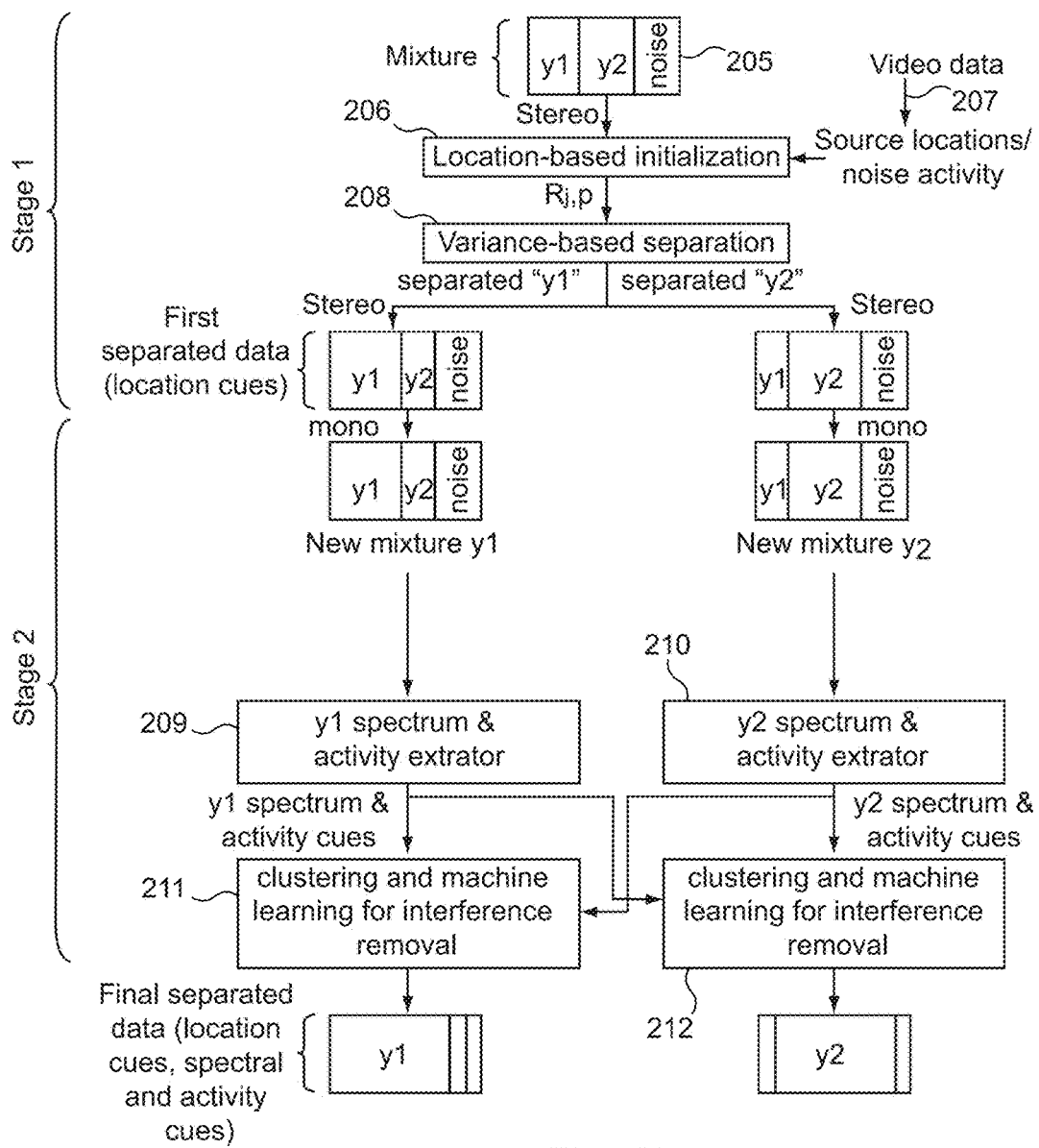
FIG. 2b is a general flowchart of steps performed according to embodiments.

FIG. 2b is a general flowchart of steps performed in each of the stages described hereinabove. Each step is further detailed in what follows.

A sound signal mixture is measured during a step 205. It is supposed here, for the sake of conciseness, that the mixture comprises two source signals y1 and y2 of two sources Source 1 and Source 2 and a noise signal. Any other number of source signals may be considered.

Next, a location-based model initialization is performed during step 206 in order to obtain respectively, the time-independent spatial parameters $R_{j,f}$ of the sources signals and the noise signal to be separated. The initialization uses the source location determined during a step 207 based on video data.

Location-based algorithms make it possible to partly separate sound signals based on the direction of each sound.

Since the position and orientation of the microphones array relatively to the camera is known, the sound direction of each source may be determined based on the images acquired by the camera.

With such information, location-based sound separation algorithms take advantage of the phase of the signals, which depends on the angular direction of the sound signals.

Binary Masking (BM), which is a method known to the skilled person, may be used in this context. When using Binary Masking, it is assumed that sound is sparse, so that each time-frequency bin (f,n) can be attributed mainly to one single sound source. For each bin (f,n), the audio mixture signal phase is compared to the corresponding ideal phases of each sound source direction. The bin (f,n) is assigned to the source with ideal phase that is the closest to measured phase.

A variance-based separation is then performed during step 208 using the model previously initialized.

After step 208, two signals are obtained. In one first signal, signal y1 is predominant but signal y2 and the noise still interfere with it. In another second signal, signal y2 is predominant but signal y1 and the noise still interfere with it.

The separation is thus not perfect. Each source signal is mixed with many parts of the other source.

Both signals are fed to the second stage in order to remove the interferences.

The microphones array has at least two microphones (thus we have n channels with n>=2 channels). Before the second stage, the multichannel signals are replaced with mono signals. For example, the n channel signals are averaged. Having n channels is useful when it is desired to use the phase information between channels. This is used during the separation stage 1 (separation stage 1 is performed using the location information contained in the phase of multichannel signals).

After stage 1, the location information (related to the phase information) is not needed any more. Transforming the multichannel signals into mono signals makes it possible to obtain separated signals which are phase independent. It makes also it possible to keep the location-based separation results, but discards all relationship between the signals and the location. Since stage 1 is performed only using location cues, no spectrum or activity cues have been used in order to get the separated signals. Therefore, these new mono mixtures are completely independent one from the other from the spectrum and activity perspectives. This independence is taken advantage of in stage 2.

Next, during a step 209, spectrum and activity cues are extracted from the first signal. Also, during a step 210, spectrum and activity cues are extracted from the second signal. Normalization may be performed of the signals during steps 209 and 210. Normalization makes it possible to prevent the weakest components of the predominant signal from completely masking the components of the other signal.

During step 211, based on the cues extracted from both the first and second signals, interferences from signal y2 are removed from the first signal thereby providing the separated sound signal for signal y1.

During step 212, based on the cues extracted from both the first and second signals, interferences from signal y1 are removed from the first signal thereby providing the separated sound signal for signal y2.

According to another aspect of the invention, the stage 2 may be associated to a stage 1 having a localization step according to prior art's embodiments, without using the video data.

Figure 3:
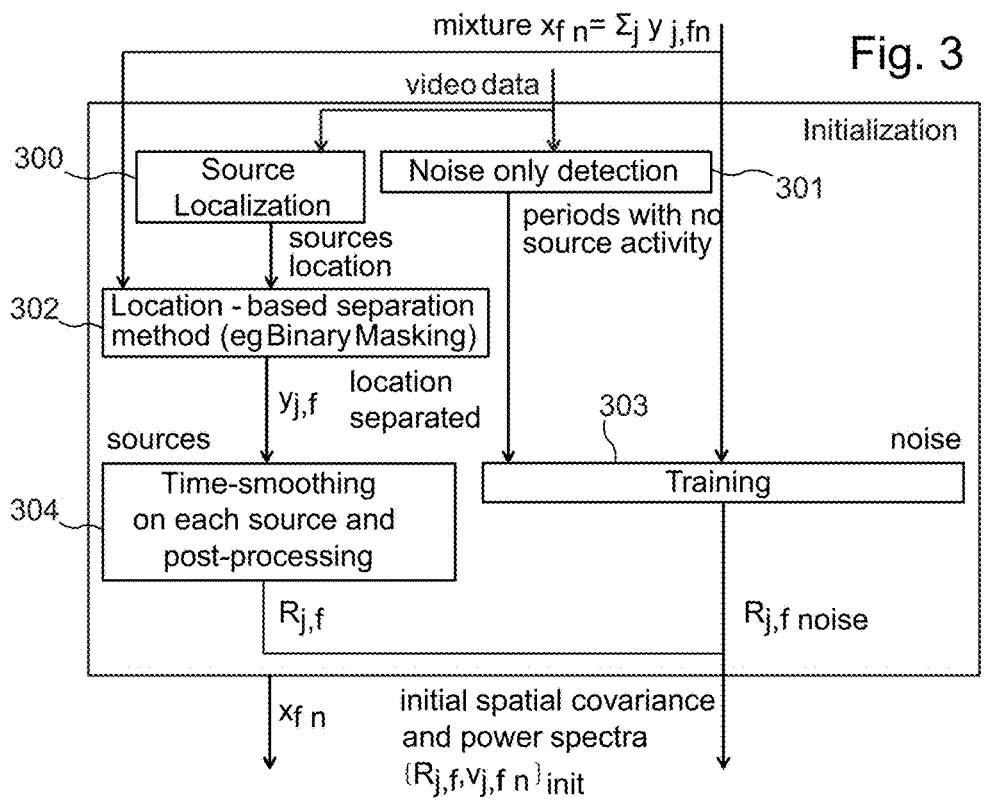
FIG. 3 is a flowchart detailing an initialization step according to embodiments.

FIG. 3 is a flowchart detailing the initialization step 206.

During a step 300, video data is analysed in order to find the location of the sound sources. Also, during a step 301, video data is analysed in order to determine the noise-only periods (periods during which the sources are silent) in the mixture. The sound sources are localized with respect to the position of the camera. For instance, the location of the sound sources may correspond to the direction of this sound source. Since the position and orientation of the microphones array relatively to the camera is known, it is easy to know the sound direction of each source starting from the image.

Based on the location of the sound sources, a location-based separation step 302 is performed thereby obtaining the separated source signals. For example, Binary Masking may be performed.

Based on the silence/activity periods determined during step 301, a training step 303 is performed in order to obtain the time-invariant spatial parameters for the noise.

A specific step, different from the steps performed for the source signals, is dedicated to noise because noise is always active (which is not the case for the sources). Also, noise comes from several directions (which is not the case for the sources which each have a respective direction).

Because noise is always active, it is impossible to perform initialization based on sources learning, since sources are always mixed with noise. In other words it is difficult to have a source active alone so it can be learned. On the contrary, when sources are inactive, noise is active alone and can therefore be learned.

Because noise comes from several directions, location-based initialization is irrelevant to noise, whereas it can be used for sources.

A time-smoothing step 304 is then performed on the separated signals in order to obtain the time-invariant spatial $R_{j,f}$ parameters for the sources.

Location-based separation methods (e.g. Binary Masking) take advantage of the phase of the signals for separating the signals. However, such methods lead to strong fluctuations of the phase at each time step. These methods are not accurate enough for proceeding to a good separation. However, by time averaging the separation results, the effects of fluctuations can be minimized and much more accurate values may be obtained. Applied to variance, this time smoothing concept can be written as:

$$R_{j,f} = \sum_n \frac{y_{j,fn\ location\ separated}\ y^H_{j,fn\ location\ separated}}{normalization\ cst}$$

where $y_{j,fn\ location\ separated}$ is the signal of the source j obtained after applying a location-based separation algorithm (e.g. Binary Masking), and n is the time frame. It is reminded here that generally speaking, f represents the frequency and n time. When it is dealt with time-frequency bins, the notation (f, n) is used. Notation $f_n$ may also be used as an abbreviation.

For each (f,n) the energy of a signal may be calculated as:

$$y_{j,fn}y_{j,fn}^H = R_{j,f}v_{j,fn}$$

wherein v is the intensity of the energy and R is the matrix that has an intensity close to 1 and that contains information concerning the phase (therefore information relating to the direction). In order to extract matrix R from the signal, the mean intensity of the energy is not to be taken into account. That is the purpose of the value "normalization cst", which can be computed as:

$$\text{trace}(\Sigma_n y_{j,fn\ location\ separated}\ y_{j,fn\ location\ separated}^H)).$$

This time smoothing can be used only with time-independent values. It can be used for obtaining a quite accurate value of the $R_{j,f}$ parameters.

Figure 4:
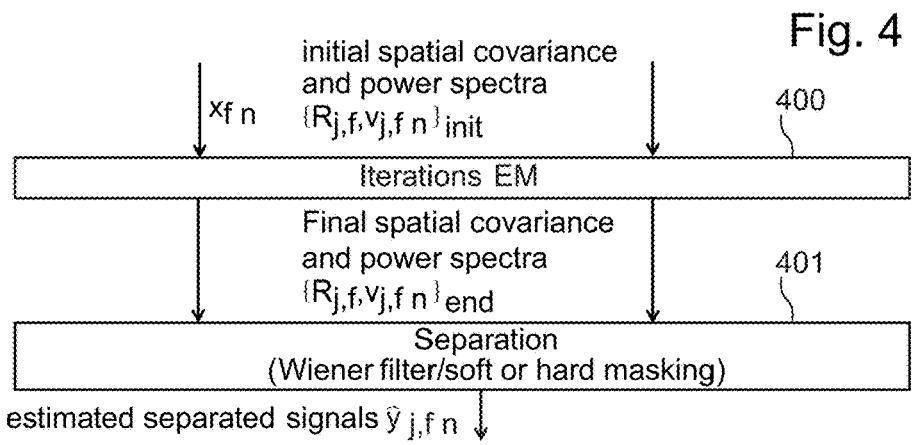
FIG. 4 is a flowchart detailing a variance-based separation step according to embodiments.

FIG. 4 is a flowchart detailing the variance-based separation step 203.

An optimization step 400 is performed based on the parameters determined during the initialization step, namely the time-invariant spatial parameters and the power spectra. For example, an iterative Expectation-Maximization process is performed. However, other processes may be used.

The optimization step refines the parameters determined during the initialization. Thus, better separated signal variances may be obtained for each source.

Next, a separation step 401 is performed so as to retrieve the signals from the variances of the sources. The step may be based on a Wiener filter or soft or hard masking.

Figure 5:
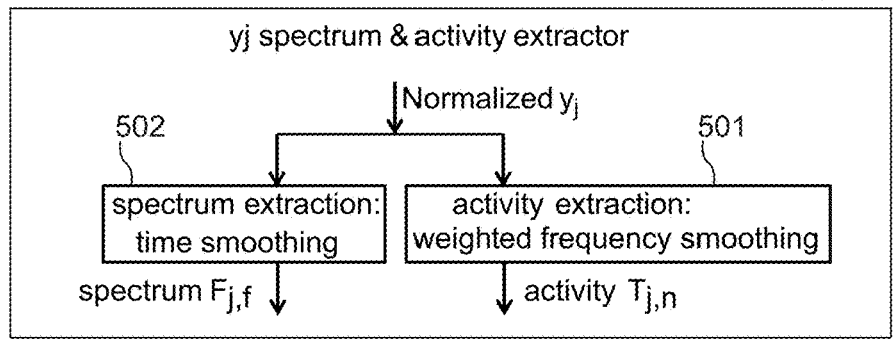
FIG. 5 is a flowchart detailing a spectrum and activity extraction according to embodiments.

FIG. 5 is a flowchart detailing the spectrum and activity extraction of steps 206 and 207.

During a step 502, the global spectra (which are the averaging over time of the signal energy) $F_{j,f}$ are estimated based on the separated signals. During a step 501, the activity $T_{j,n}$ is estimated based on the separated signals.

For the global spectrum extraction 502, "time smoothing" may be used. This makes it possible to enhance the spectrum of the source to separate and decrease the contribution of the other sources.

For the activity extraction 501, "weighted frequency smoothing" may be used. This makes it possible to enhance the activity of the source to separate and decrease the contribution of the other sources.

However, low frequencies have a much higher amplitude (and energy) than medium/high frequencies. It means that for frequency smoothing, using a simple averaging may not be sufficient. The contribution of low frequencies will be overestimated. Therefore, a weighted averaging may be used for obtaining a relevant smoothing.

In order to improve intelligibility of the signals, the weighting may be selected according to the human listening sensibility. It will both decrease fluctuations and maximize intelligibility.

Applied to variance, this weighted averaging can be written as:

$$F_{j,f} = \Sigma_n y_{j,fn} y_{j,fn}^H$$

$$T_{j,n} = \Sigma_f y_{j,fn} y_{j,fn}^H .* filter\_A$$

Where filter_A is a filter corresponding to the frequency dependence of the loudness perceived by the human ear.

As a result, this weighted smoothing enhances the signals of the sources to separate and decreases interferences in order to get appropriate frequency spectrum $F_{j,f}$ and activity $T_{j,n}$ patterns. Global spectra $F_{j,f}$ and activity $T_{j,n}$ are obtained that have less interference than in the original signal. However, this does not mean that any interferences in the signal $y_{j,fn}$ have been removed at all. Only cleaner $F_{j,f}$ and $T_{j,n}$ have been obtained. They are now going to be used for recovering a cleaner signal, as explained in what follows.

Figure 6:
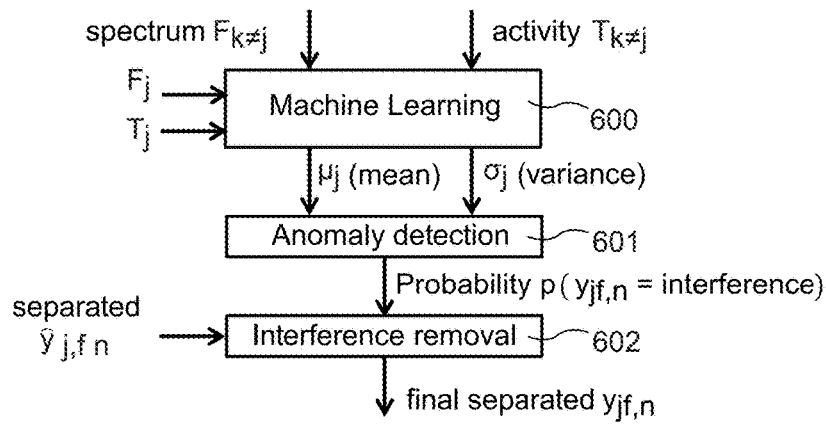
FIG. 6 is a flowchart detailing an interference removal according to embodiments.

FIG. 6 is a flowchart detailing the interference removal performed at steps 211, 212.

During a step 600 a machine learning process is performed. Machine Learning generally comprises learning a feature based on one training dataset and applying the learned feature to a different testing dataset. The training and testing datasets are generally different in order to avoid overfitted training and bad results.

During the interference removal, the aim is to remove the components of sources $y_k$ (k≠j) in separated source $y_j$. Thus, in order to remove interferences k from $y_j$, a database for training recognition of $y_k$ is needed, which must be independent from $y_j$ for appropriate learning.

As an example, we cannot use the first separated signal y1 as a source of training data to identify the interferences in y1. We must use something independent; since y2 is independent from y1 from a spectrum and activity point of view (even if not from a phase point of view), y2 can be used as a source of training data to identify interferences in y1.

Applied to the present location-based signal separation, one example of appropriate machine learning (Clustering) can be written with a new variable:

$$z_{j,f,n} = \left[ \frac{\sum_{k \neq j} F_{k,f}}{F_{j,f}} ; \frac{\sum_{k \neq j} T_{k,n}}{T_{j,n}} \right].$$

Such new variable has all properties to be used for the training of normality for each source j. In what follows, "normality" is used as the opposite of "anomaly" or "abnormality" in a Machine Learning paradigm. In such learning paradigm, we need data for each type to be clustered. So, we need data for j, as well as data for non-j. In the case of zj, we need data for j index, which is the "normality". And we need data for values different from j, which corresponds to the abnormality to be detected in this anomaly detection Machine Learning framework.

The new variable is a multi-dimensional variable with high values where k≠j is strong (meaning with higher level of energy) vs j and low values where j is strong vs k≠j. Such choice helps highlighting the bins (f,n) where there is a strong difference between source j and its interferences. Legitimate bins will have low values of $z_{j,f,n}$, whereas interferences will have exponentially increasing values of $z_{j,f,n}$. This normality is used to calculate statistics p (see below). For each separated signal $y_j$ for source j.

The $z_{j,f,n}$ values are fed to a machine learning process that is used for performing an anomaly detection step 601, like multivariate Gaussian clustering, based on the new variable.

A probability p is computed as follows (N is the total number of samples and F is the total number of frequencies):

$$p(z_{j,f,n}) = \frac{1}{2\Pi|\sigma_j|^{\frac{1}{2}}} \exp\left(-\frac{1}{2}(z_{j,f,n} - \mu_j)^H \sigma_j^{-1}(z_{j,f,n} - \mu_j)\right)$$

$$\text{with } \mu_j = \left(\frac{1}{F \cdot N}\right) \sum_f \sum_n z_{j,f,n} \text{ (mean)}$$

$$\sigma_j = \frac{1}{F \cdot N} \sum_f \sum_n (z_{j,f,n} - \mu_j)^H (z_{j,f,n} - \mu_j) \text{ (variance)}$$

$|\sigma_j|$ is the determinant of $\sigma_j$

An anomaly is detected if $(z_{j,f,n} > [th_1; th_2])$ (condition 1) and $(p(z_{j,f,n}) < \varepsilon)$ (condition 2)

According to the above formula, interference is removed upon the following conditions:

1) Condition 1: $z_{j,f,n}$ was defined such that interferences exhibit high $z_{j,f,n}$ values.
2) Condition 2: Interferences are abnormal events, i.e. their $z_{j,f,n}$ values must be quite different from mean $z_{j,f,n}$ values.

Condition 1) is met when $z_{j,f,n} > [th1; th2]$ where th1 and th2 are the thresholds corresponding to the respective components 1 and 2 of $z_{j,f,n}$, i.e th1 corresponds to F and th2 corresponds to T.

Condition 2) is met through $p(z_{j,f,n})$, which is computed using a Gaussian-like probability calculation based on means $\mu_j$ and variances $\sigma_j$. $p(z_{j,f,n})$ the probability that $z_{j,f,n}$ is a normal and legitimate signal (i.e not an interfering signal). If $p(z_{j,f,n})$ is lower that a given normality threshold level $\varepsilon$ ($\varepsilon$ being greater or equal to 0 and strictly below 1), it means that the bin (f,n) is probably an interference signal.

Here, the calculation of $\mu_j$ and $\sigma_j$ is performed during step 600.

Thanks to the use of $\Sigma_{k \neq j} F_{k,f}$ and $\Sigma_{k \neq j} T_{k,n}$, we have the required parts independent from source j in a sense, it corresponds to the use of cues independent from source j to detect those components in the signal $y_j$ corresponding to source j and remove them during a step 602.

Figure 7:
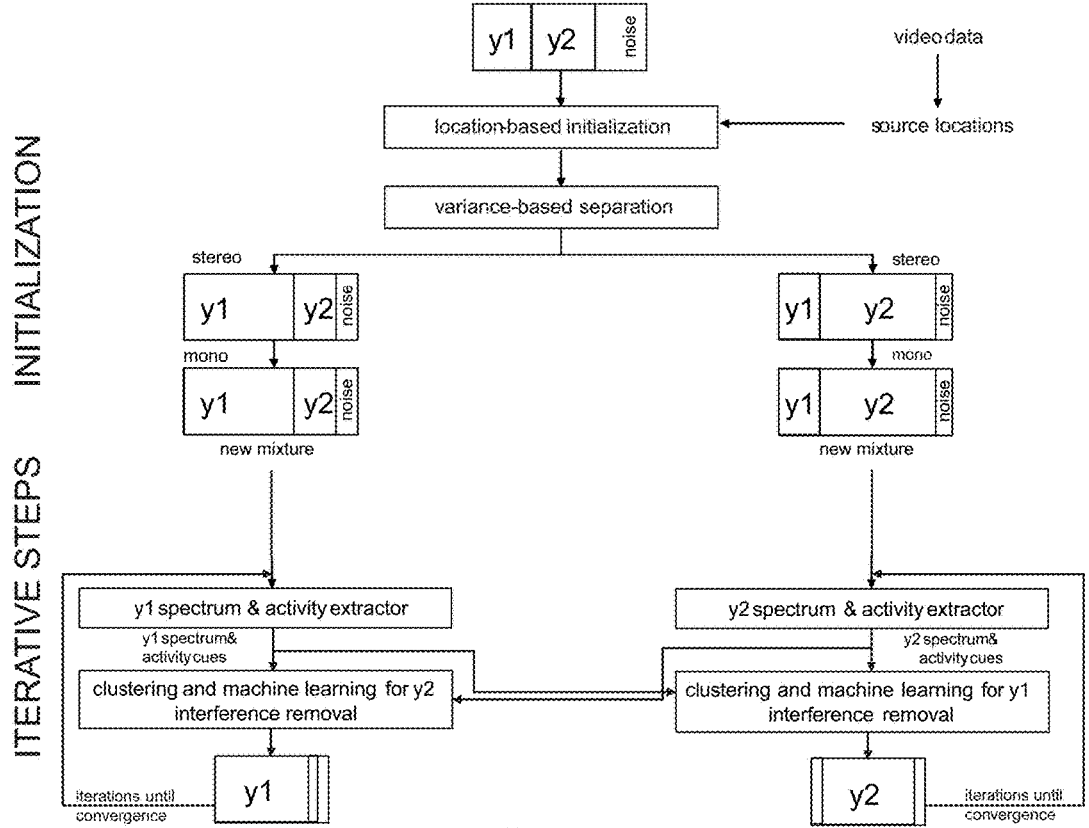
FIG. 7 illustrates a step by step interference removal according to embodiments.

FIG. 7 illustrates a variant of the method described herein above according to which, in the second stage, instead of removing the interferences in one single step 211, 212, interferences are removed step by step until a convergence is reached (at each iteration, frequency spectrum and activity are re-evaluated and are closer to reality so that interferences are easier to detect).

The iterations make it possible to avoid the risk of being too drastic in the removal and remove not only interferences but also too many parts of legitimate signal).

Figure 8A:
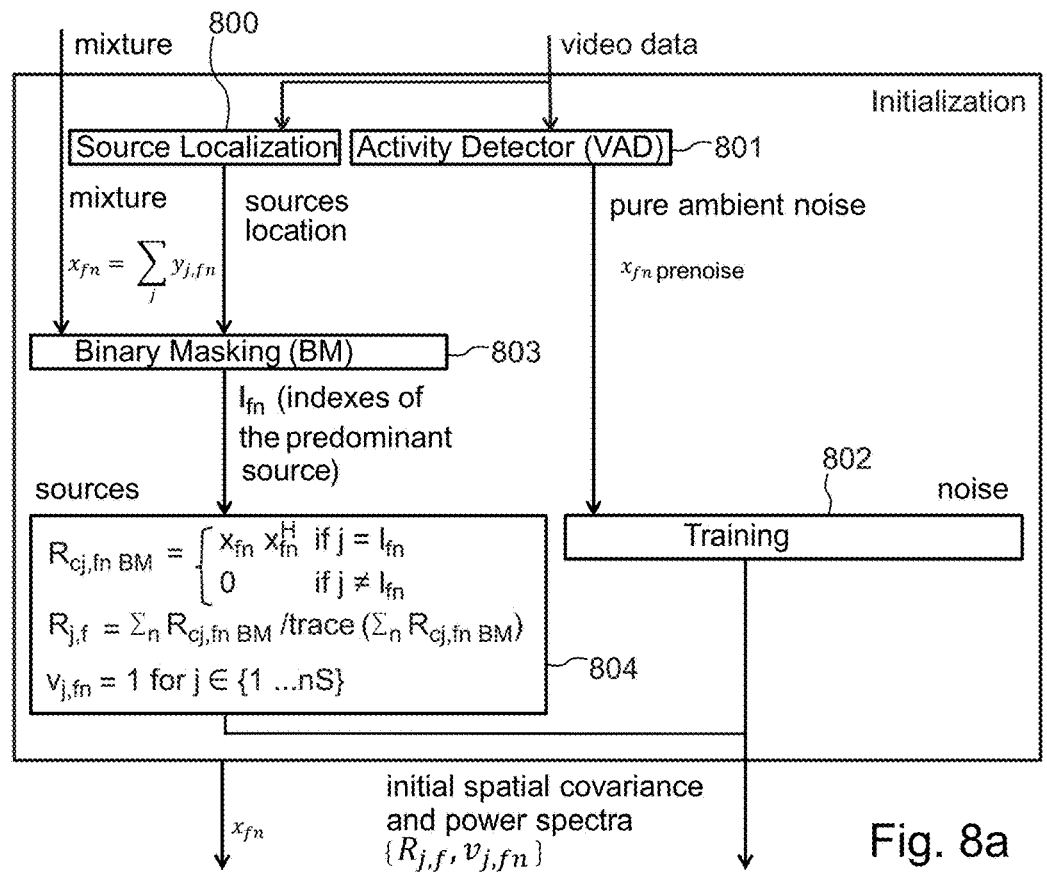
FIG. 8a is a flowchart of steps detailing an initialization of parameters for a sound separation according to embodiments.
Figure 8C:
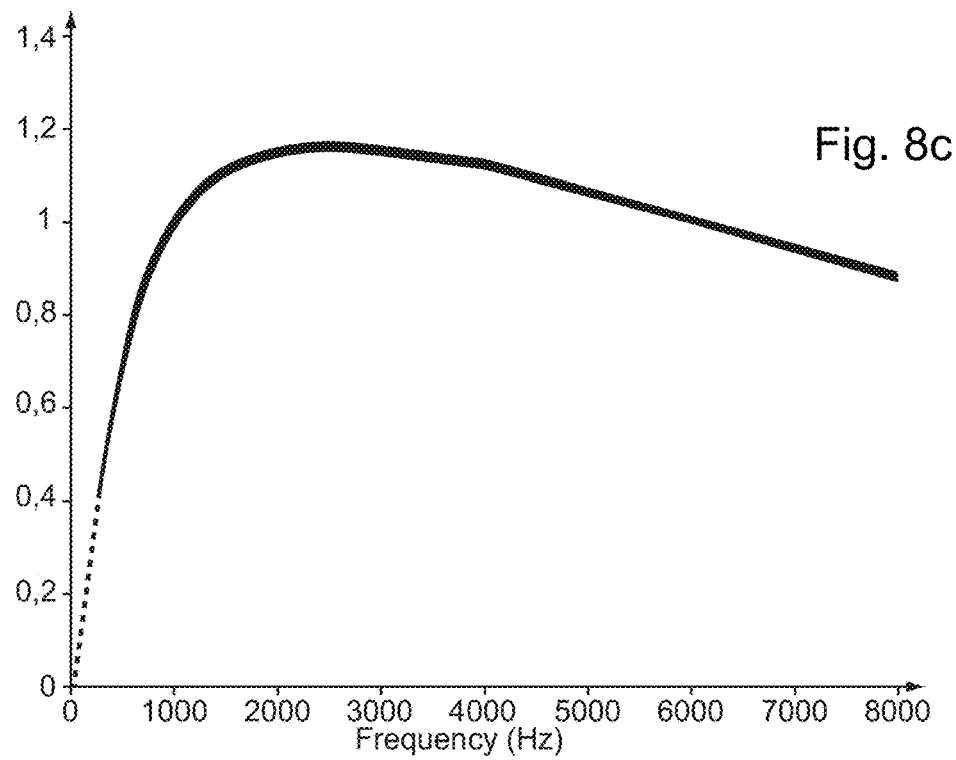
FIG. 8c illustrates an exemplary filter for energy correction.
Figure 8B:
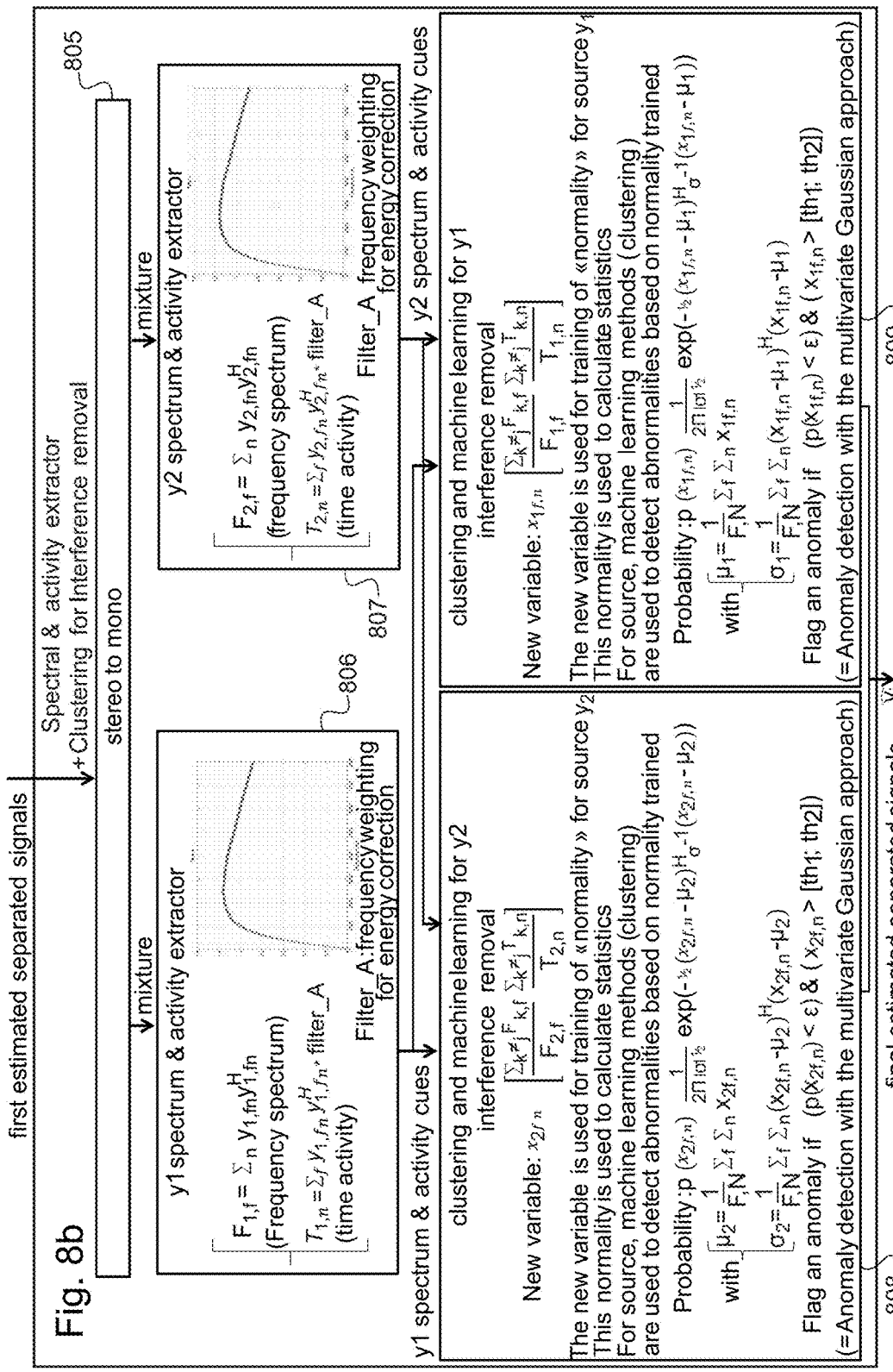
FIG. 8b is a flowchart of steps performed for an interference removal in a first estimation of separated signals according to embodiments.

With reference to FIGS. 8a-8b a more detailed embodiment is described.

FIG. 8a is a flowchart of steps performed for the initialization of the parameters for the sound separation.

Based on video data associated to a sound mixture, the sources of the sound signals of the mixture are localized during a step 800.

The video data is also used in a step 801 for identifying the ambient noise based on the activity/silence periods of the sound sources.

Based on the ambient noise identified and the sound mixture, a training step 802 is performed in order to determine the initial parameters for the ambient noise.

Based on the location of the sources determined during step 800 and the sound mixture, a binary masking step 803 is performed. During this step, the indexes $I_{f,n}$ of the predominant sources are determined (for example, for the time frequency bin $f_q$, the index $I_{fq}=q$).

Next, the initial parameters for the sound sources are determined during a step 804 as follows:

$$R_{j,f} = \sum_n R_{cj,fnBM} / \text{trace}\left(\sum_n R_{cj,fnBM}\right)$$

with $R_{cj,fnBM} = x_{fn} x_{fn}^H$ if $j = l_{fn}$ 0 if $j \neq l_{fn}$ and $v_{j,fn} = 1$ for $j \in \{1...nS\}$.

Once the initial parameters are determined, a first estimation of the separated signals may be performed, for example by an expectation maximization process coupled to soft or hard masking. Alternatively, the expectation maximization process is coupled to a Wiener filter.

FIG. 8b is a flowchart of steps performed for the interference removal in the first estimation of the separated signals.

In a step 805, in case two microphones are used, both signals obtained from each microphone (stereo signals) are processed. Before the second stage, only mono signals may be kept, for example by averaging the two stereo signals.

Next, the spectrum and activity parameters are extracted from a first separated signal y1 in a step 806 and the spectrum and activity parameters are extracted from a second separated signal y2 in a step 807. For the sake of conciseness, it is supposed that only two sound signals are separated.

The frequency spectrum parameters are determined as follows for y1 and y2 respectively:

$$F_{1,f} = \Sigma_n y_{1,fn} y_{1,fn}^H$$

$$F_{2,f} = \Sigma_n y_{2,fn} y_{2,fn}^H$$

The activity parameters are determined as follows for y1 and y2 respectively:

$$T_{1,n} = \Sigma_f y_{1,fn} y_{1,fn}^H .*filter\_A$$

$$T_{2,n} = \Sigma_f y_{2,fn} y_{2,fn}^H .*filter\_A$$

wherein an exemplary filter for energy correction filter_A corresponding to the frequency dependence of the loudness perceived by the human ear is illustrated in FIG. 8c.

The outputs of steps 806 and 807 are both used in an interference removal step 808 for removing the interferences of signal y2 in y1 and an interference removal step 809 for removing the interferences of signal y1 in y2.

A new variable $$x_{2f,n} = \left[ \frac{\sum_{k \neq j} F_{k,f}}{F_{2,f}}; \frac{\sum_{k \neq j} T_{k,n}}{T_{2,n}} \right]$$

is defined in step 808 for training the "normality" of signal y2 and remove it from signal y1.

To do so, the following probability is computed:

$$p(x_{2f,n}) = \frac{1}{2\Pi|\sigma|^{\frac{1}{2}}} \exp\left(-\frac{1}{2}(x_{2f,n} - \mu_2)^H \sigma^{-1}(x_{2f,n} - \mu_2)\right)$$

$$\text{with } \mu_2 = \frac{1}{F \cdot N} \sum_f \sum_n x_{2f,n}$$

$$\sigma_2 = \frac{1}{F \cdot N} \sum_f \sum_n (x_{2f,n} - \mu_2)^H (x_{2f,n} - \mu_2)$$

and an anomaly is detected with the multivariate Gaussian approach (already discussed hereinabove) when $(p(x_{2f,n}) < \varepsilon)$ & $(x_{2f,n} > [th_1; th_2])$.

Similarly, a new variable $$x_{1f,n} = \left[ \frac{\sum_{k \neq j} F_{k,f}}{F_{1,f}}; \frac{\sum_{k \neq j} T_{k,n}}{T_{1,n}} \right]$$

is defined in step 808 for training the "normality" of signal y1 and remove it from signal y2.

To do so, the following probability is computed:

$$p(x_{1f,n}) = \frac{1}{2\Pi|\sigma|^{\frac{1}{2}}} \exp\left(-\frac{1}{2}(x_{1f,n} - \mu_1)^H \sigma^{-1}(x_{1f,n} - \mu_1)\right)$$

$$\text{with } \mu_1 = \frac{1}{f,n} \Sigma_f \Sigma_n x_{1f,n}$$

$$\sigma_1 = \frac{1}{f,n} \Sigma_f \Sigma_n (x_{1f,n} - \mu_1)^H (x_{1f,n} - \mu_1)$$

and an anomaly is detected with the multivariate Gaussian approach (already discussed hereinabove) when $(p(x_{1f,n}) \geq \varepsilon)$ & $(x_{1f,n} > [th_1; th_2])$.

In what follows, results that can be attained with methods according to embodiments are discussed with reference to FIGS. 9a-9nd 10a-10b.

Figure 9A:
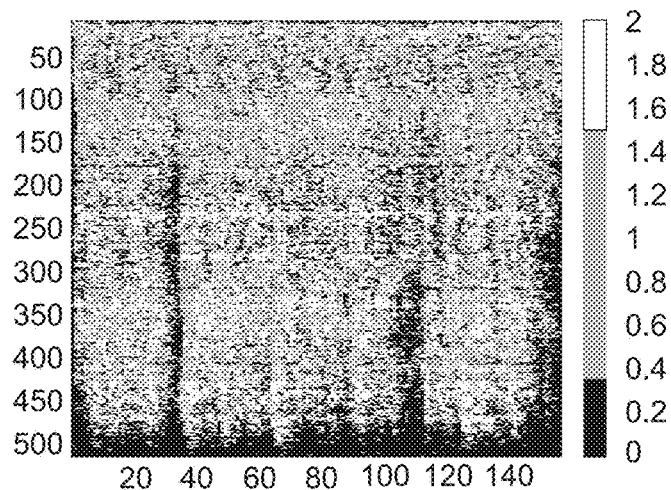
FIG. 9a is a time-frequency representation of a signal separated using a method according to embodiments.

FIG. 9a is a time-frequency representation of a signal separated using a method according to embodiments. Time is represented in abscissa and frequency in ordinates. The scale next to the graph shows the energy levels of the signals. The darkest the signal is represented, the lowest the energy of the signal is. A variance-based process coupled to a location-based initialization has been used. The separated signal is superimposed on the original signal in order to compare them. Elements of the signal that have been correctly separated are shown in grey Elements of the signal that have been incorrectly separated (which belong to another source, i.e. the interference elements) are shown in white.

The majority of the elements have been correctly separated. The separation process is thus globally satisfying. However, interferences still remain. An interference removal process is thus desirable.

Figure 9B:
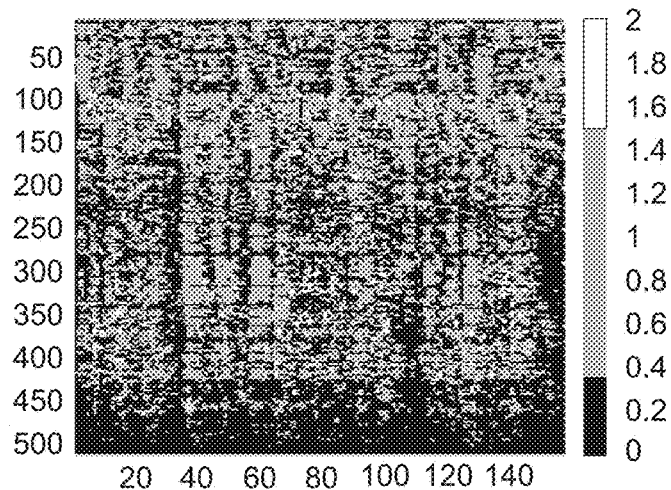
FIG. 9b is a time-frequency representation of a separated signal enhanced with interference removal according to embodiments.

FIG. 9b is a time-frequency representation of a separated signal enhanced with interference removal according to embodiments. Time is represented in abscissa and frequency in ordinates. The scale next to the graph shows the energy levels of the signals. The darkest the signal is represented, the lowest the energy of the signal is. The separated signal output by the interference removal process is superimposed on the separated signal input to the interference removal process in order to compare them. Elements of the signal that have been correctly separated are shown in grey Elements of the signal that have been incorrectly separated (which belong to another source, i.e. the interference elements) are shown in white.

With comparison to FIG. 9a, the number of both correct and incorrect elements of the signal have decreased. However, in proportion, more incorrect elements have disappeared than correct elements. It means that the signal to interferences ration has increased. Therefore, intelligibility of the signal has been improved.

Figure 9C:
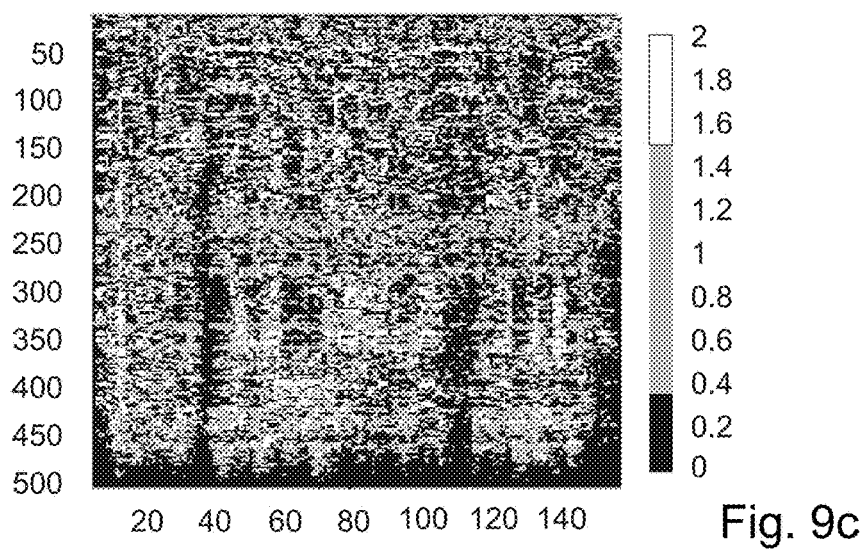
FIG. 9c is a time-frequency representation of a signal separated and enhanced according to embodiments, FIG. 10a compares the estimated spectrum of a separated signal to the spectrum of the original signal, FIG. 10b compares the estimated activity of a separated signal to the activity of the original signal.

FIG. 9c is a time-frequency representation of a signal separated and enhanced according to embodiments using both a variance-based process coupled to a location-based initialization and an interference removal process. Time is represented in abscissa and frequency in ordinates. The scale next to the graph shows the energy levels of the signals. The darkest the signal is represented, the lowest the energy of the signal is. The separated signal output by the overall process is superimposed on the original signal in order to compare them. Elements of the signal that have been correctly separated are shown in grey Elements of the signal that have been incorrectly separated (which belong to another source, i.e. the interference elements) are shown in white.

FIG. 9c shows many more correct elements than incorrect elements. A random removal process would have led to many more incorrectly suppressed elements than correctly suppressed ones. This shows the good selectivity of the removal process.

The good results attained are due in part to the good extractions of the spectrum and activity parameters in the interference removal process.

Figure 10A:
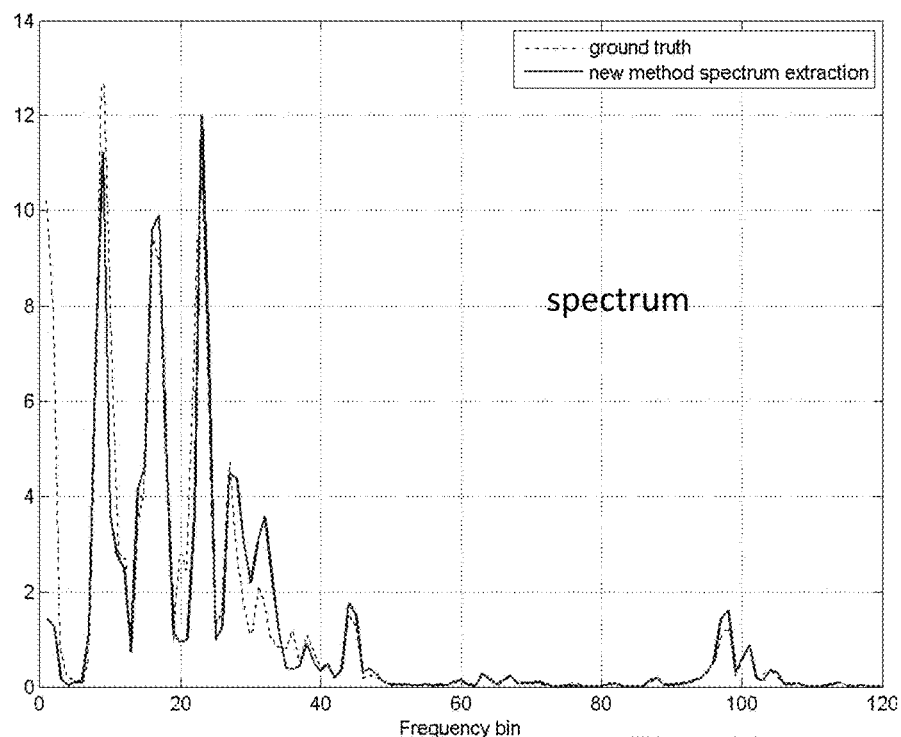

FIG. 10a compares the estimated spectrum (continuous line) of a separated signal to the spectrum of the original signal (dotted line). The two spectra are very close which shows an efficient extraction.

Figure 10B:
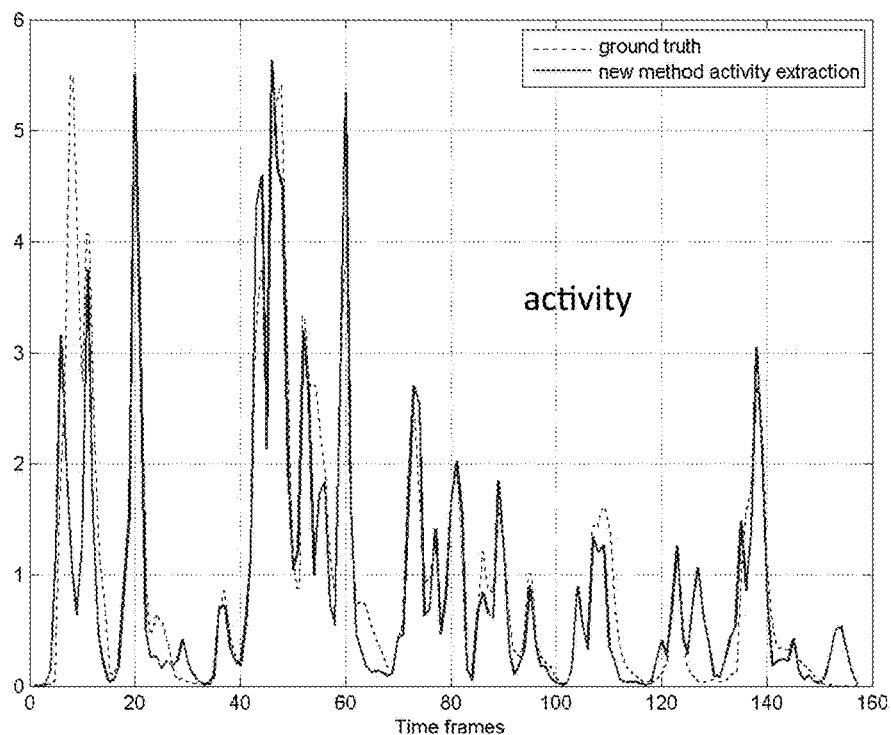

FIG. 10b compares the estimated activity (continuous line) of a separated signal to the activity of the original signal (dotted line). The two activities are very close which shows an efficient extraction.

Figure 11:
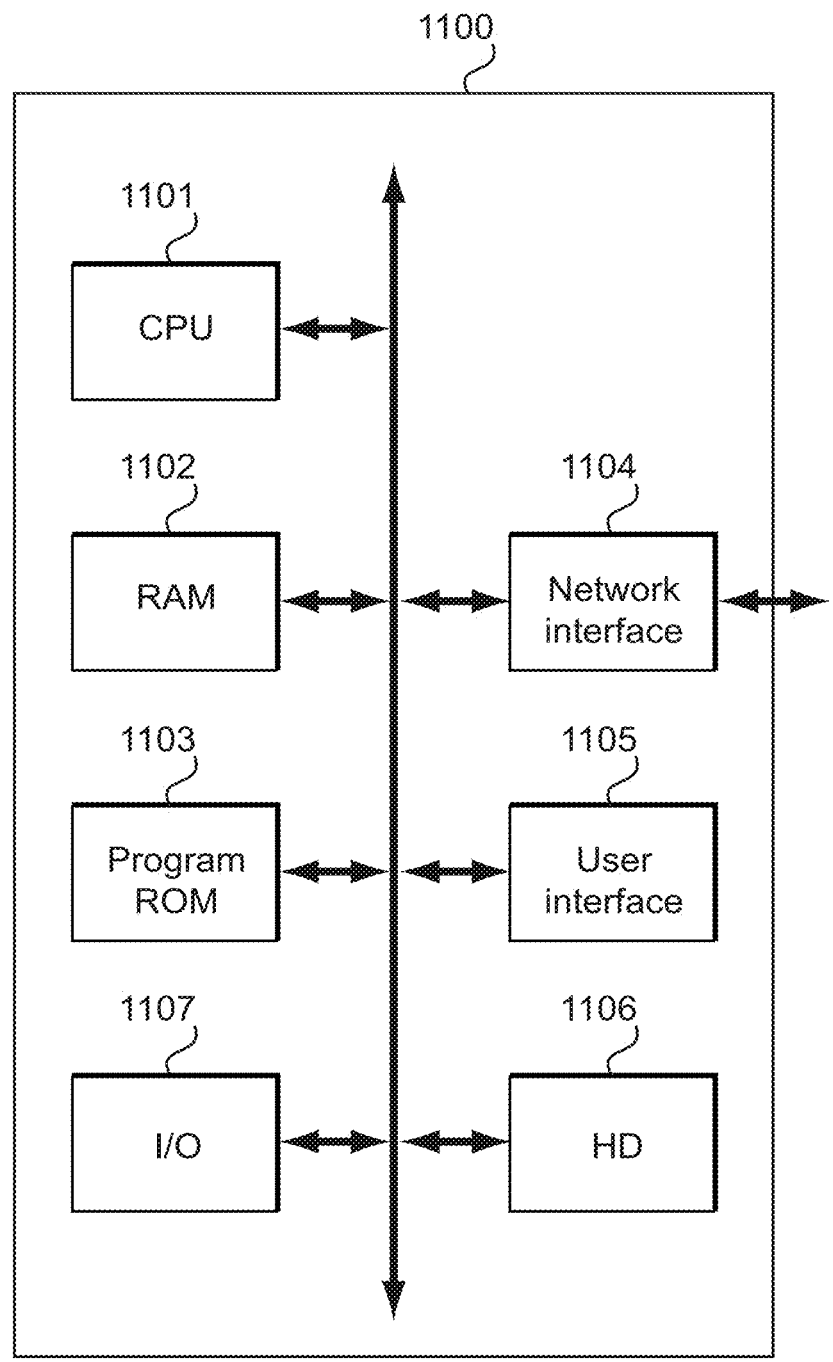
FIG. 11 is a schematic illustration of a device according to embodiments.

FIG. 11 is a schematic illustration of a device according to embodiments. The device may be a sound source separation device that implements, for example, "stage 1" as described hereinabove. It may also be a sound source separation enhancement device that implements, for example, "stage 2" as described hereinabove. It may also be a device that implements both sound source separation and enhancement thereof, by implementing, for example, "stage 1" and "stage 2" as described hereinabove.

The device comprises a RAM memory 1102 which may be used as a working memory for a control unit 1101 configured for implementing a method according to embodiments. For example, the control unit may be configured to execute instructions of a computer program loaded from a ROM memory 1103. The program may also be loaded from a hard drive 1106. For example, the computer program is designed based on the appended flowcharts and the above description.

The device also comprises a network interface 1104 which may be a single network interface, or comprise a set of network interfaces (for instance several wireless interfaces, or several types of wired or wireless interfaces). The device may comprise a user interface 1105 for displaying information to a user and for receiving inputs from the user.

The device may also comprise an input/output module 1107 for receiving and/or sending data from/to external devices.

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

What is claimed is:

1. A sound source separation method comprising:
   determining at least one location of a sound source based on video data,
   determining at least one time-independent parameter characterizing an audio signal emitted by the sound source in the video data, the at least one time-independent parameter being determined based on the at least one location and on the audio signal,
   determining at least one time-dependent parameter characterizing the audio signal emitted by the sound source based on the at least one time-independent parameter and on the audio signal, and
   separating the audio signal from a combination of audio signals based on the at least one time-independent parameter and on the at least one time-dependent parameter.

2. The method according to claim 1, wherein determining the at least one time-independent parameter comprises determining an initial estimate of the at least one time-independent parameter, and comprises determining a final estimate of the at least one time-independent parameter using an expectation-maximization method,
   wherein determining the at least one time-dependent parameter comprises determining an initial estimate of the at least one time-dependent parameter and comprises determining a final estimate of the at least one time-dependent parameter using the expectation-maximization method, and
   wherein separating the audio signal from the combination of audio signals is based on the final estimate of the at least one time time-independent parameter and on the final estimate of the at least one time-dependent parameter.

3. The method according to claim 1, wherein the at least one time-dependent parameter is a spatial covariance matrix, and
   wherein the at least one time-dependent parameter is a power spectrum.

4. A sound source separation device comprising:
   one or more processors; and
   memory storing one or more programs configured to be executed by the one or more processors, the one or more programs including instructions for:
   determining at least one location of at least one sound source based on video data,
   determining initial estimates of at least two parameters characterizing an audio signal emitted by the sound source, the initial estimates of the at least two parameters being determined based on the at least one location,
   determining final estimates of the at least two parameters characterizing the audio signal using an expectation-maximization method;
   detecting a noise signal based on the video data,
   determining at least one parameter characterizing the noise signal, and
   separating the audio signal from a combination of audio signals based on the final estimates of the at least two parameters characterizing the audio signal and on the at least one parameter characterizing the noise signal.

5. The device according to claim 4, wherein determining the initial estimates of the at least two parameters characterizing the audio signal comprises determining time-independent spatial parameters.

6. The device according to claim 4, wherein determining the initial estimates of the at least two parameters characterizing the audio signal is part of an initialization of a sound propagation model.

7. The device according to claim 4, wherein determining the initial estimates of the at least two parameters characterizing the audio signal comprises determining power spectra parameters.

8. The device according to claim 4, wherein the video data comprises video surveillance data.

9. The device according to claim 4, wherein determining the at least one parameter characterizing the noise signal includes
   determining initial estimates of at least two parameters characterizing the noise signal,
   wherein the expectation-maximization method is also performed for determining final estimates of the at least two parameters characterizing the noise signal, and wherein separating the audio signal from the combination of audio signals is based on the final estimates of the at least two parameters characterizing the noise signal.

10. The device according to claim 4, wherein determining the at least one location of the at least one sound source based on the video data is performed using binary masking.

11. The device according to claim 4, wherein the one or more programs include further instructions for:
determining a first frequency spectrum and a first activity parameter for a first separated signal of the combination of audio signals,
determining a second frequency spectrum and a second activity parameter for a second separated signal of the combination of audio signals, and
removing interferences from the second separated signal based on the first and second frequency spectra and activity parameters, thereby obtaining an enhanced separated signal.

12. The device according to claim 11, wherein the second separated signal is phase independent.

13. The device according to claim 11, wherein the second separated signal is obtained from a processing of stereo signals from a microphone array.

14. The device according to claim 11, wherein the second separated signal is obtained from an averaging of stereo signals.

15. The device according to claim 11, wherein the one or more programs include further instructions for normalizing the first separated signal and the second separated signal.

16. The device according to claim 11, wherein determining the first and second frequency spectra and activity parameters comprises applying a filter corresponding to the sound perception of a human ear.

17. The device according to claim 11, wherein removing the interferences comprises an anomaly detection.

18. A non-transitory information storage means readable by a computer or a microprocessor storing a computer program that includes instructions for:
determining at least one location of a sound source based on video data,
determining at least one time-independent parameter characterizing an audio signal emitted by the sound source in the video data, the at least one time-independent parameter being determined based on the at least one location and on the audio signal,
determining at least one time-dependent parameter characterizing the audio signal emitted by the sound source based on the at least one time-independent paramter and on the audio signal, and
separating the audio signal from a combination of audio signals based on the at least one time-independent parameter and on the at least one time-dependent parameter.

19. The non-transitory information storage means of claim 18, wherein the at least one time-dependent parameter is a spatial covariance matrix, and
wherein the at least one time-dependent parameter is a power spectrum.

* * * * *